July 2, 1940.   J. L. SAGER   2,206,306
BATTERY SYSTEM
Filed Oct. 2, 1933   2 Sheets—Sheet 1
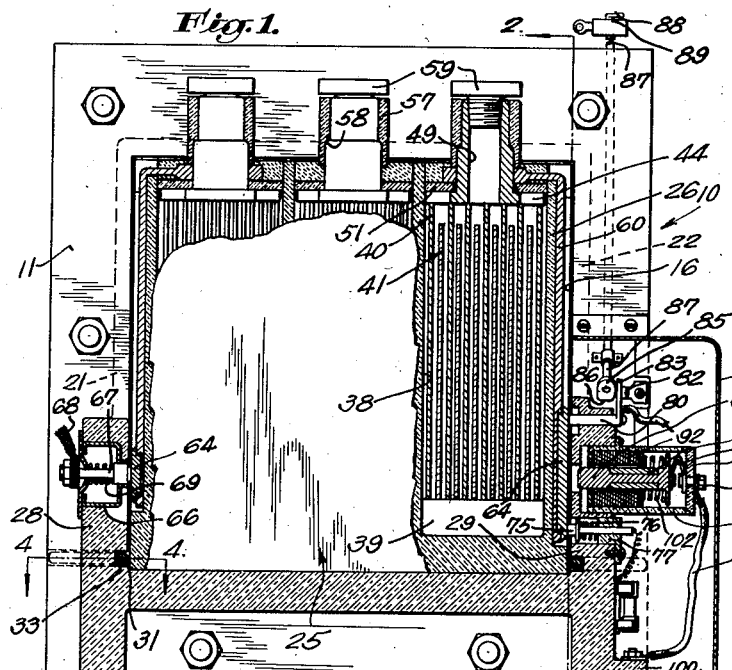
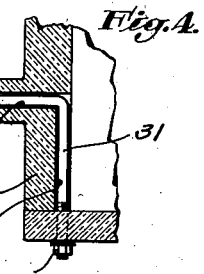
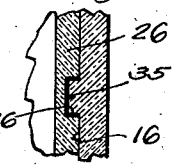
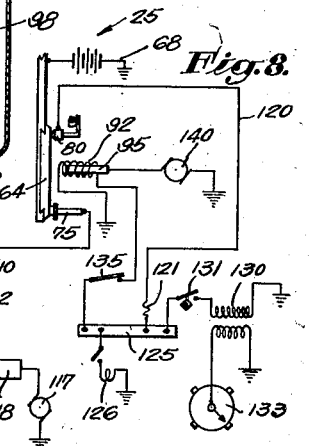
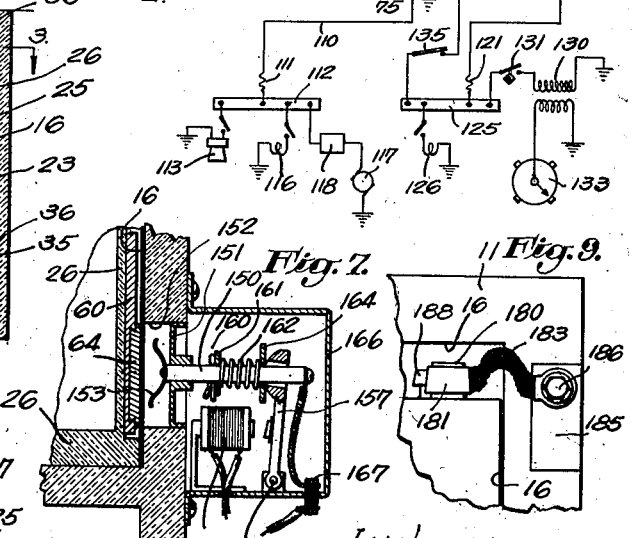
INVENTOR:
JOHN L. SAGER,
By
Clarence F. Kool
ATTORNEY.

July 2, 1940.   J. L. SAGER   2,206,306
BATTERY SYSTEM
Filed Oct. 2, 1933   2 Sheets-Sheet 2

INVENTOR
JOHN L. SAGER

BY

ATTORNEY.

Patented July 2, 1940

2,206,306

UNITED STATES PATENT OFFICE 2,206,306

BATTERY SYSTEM

John L. Sager, Southgate, Calif.

Application October 2, 1933, Serial No. 691,792

27 Claims. (Cl. 180—1).

My invention relates to battery systems of the storage type, and more particularly to a novel battery and container which are well suited to use in conjunction with automobile circuits, the invention also comprehending a novel method of conducting current from a battery to the starting and other circuits of a prime mover such as an internal combustion engine. For illustrative purposes the invention has been disclosed in conjunction with an automobile, but while it cooperates with such an automobile both structurally and electrically in a novel manner, it should not be understood that the invention is limited to this use.

The present type of multi-cell automobile battery mounted beneath the floor-boards of an automobile is subject to many objections. One of the foremost objections is the necessity of a relatively long battery cable extending to the starting motor, this cable being at a potential above ground at all times. This cable is relatively large in diameter so as to carry the several-hundred amperes often necessary in starting modern multi-cylinder engines. It constitutes a well-recognized fire hazard in view of its large size and constant above-ground potential, for chafing of the insulation of this cable will result in forming a short-circuit of large current capacity which is a frequent cause of disastrous fires. Further, the terminals of the conventional battery are subject to corrosion, this factor being one of the foremost causes of battery deterioration and failure. Such corrosion is primarily caused by acid fumes and the heretofore necessary use of dissimilar metals at the terminals. Such corrosion not only quickly destroys the effective electrical contact if not frequently removed, but also forms a leakage path tending to discharge the battery. Such leakage paths are also formed by any moisture, mud, etc., deposited on the surfaces of the battery case, and the present system of mounting the battery beneath the floor-boards of an automobile, positions the battery in a location where it is peculiarly susceptible to moisture conditions. Further, it is not infrequent in colder climates to experience trouble with a battery freezing, this being due in part to its exposed position beneath the car.

It is an object of the present invention to mount a battery beneath the hood of an automobile, thus removing it from its previously exposed position beneath the car where it was susceptible to moisture accumulations, freezing, etc. By placing such a battery under the hood of an automobile the natural heat of the engine dries out the atmosphere around the battery and prevents freezing of the battery. Further, the fan-circulated air removes all acid fumes directly from the engine compartment.

It is a further object of the present invention to provide a battery system which is substantially corrosion-free. This I accomplish by designing my structure so that dissimilar metals are entirely eliminated in the terminal zone at the top of the battery, and it is a further object of the invention to provide a battery in which current is withdrawn at a section below the upper end thereof and thus out of the zone where acid fumes tend to be released from the battery.

Another very important object of the invention is to eliminate in large degree any possible fire hazard from circuits such as the high-capacity circuit feeding the starting motor. This I accomplish by providing a normally de-energized conductor which is connected directly to the starting motor and which is only connected to the battery during actual starting operations.

Other novel features of the invention lie in the novel contact means used for thus energizing the starting motor, and in its remote-control feature, as well as in the other contact means for taking current from the battery.

Still another object of the invention is to provide a contact means for supplying current to certain of the auxiliary circuits of the automobile and which is in electrical connection with the battery only when it is desired to energize these circuits. Such a contact means may conveniently supply the ignition circuits of the car, so that the provision of a suitable lock associated directly or indirectly with this contact means furnishes an excellent locking means for the car. Such a structure also falls within the scope of the present invention, as well as the provision of certain of the heavier-current circuits connected to such a switch means so as to be de-energized when the car is locked or unattended, thus preventing current drainage should the driver forget to turn off these circuits before leaving the car. Such a system also decreases fire hazards in that the circuits are energized only during the time they are used.

Almost invariably in present-day practice batteries for automobiles are made somewhat smaller than the chamber into which they are to fit, reliance being placed upon wedges, blocks, etc., suitably forced against the battery to hold it in place. Such clamping means almost invariably become loose with vibration, and are often carelessly installed by workers when replacing the battery. The result is that almost all batteries in present-day cars are subject to some vibration due to being improperly clamped. This results not only in loosening the conventional terminals and opening up acid-carrying spaces around the terminals where these terminals pass through the battery compound normally used in sealing the tops of the batteries, but also results in shaking from the plates of the battery some of the active material retained therein, thus materially decreasing the life of the battery.

It is an object of the present invention to provide an improved container for a battery, together with an improved clamping means which retains the battery in fixed position.

It is another object of the present invention to provide inter-engaging shoulders on both the battery and the container for holding the battery in position.

A further defect with conventional battery systems lies in the clamp-type ring terminals normally employed. The terminal post is invariably made of lead while the actual contact is effected through a lead-coated brass or copper terminal clamped around the terminal post. This not only presents a bi-metallic system susceptible of corrosion, but necessitates the use of a wrench for clamping the terminal structure. This invariably results in a tendency to twist and loosen the terminal post, thus forming passages carrying the acid fumes to the top of the battery.

It is an object of the present invention to eliminate all terminals on the battery requiring application of torsion forces in tightening, and to greatly shorten the time required for installation of a battery in a car.

Further objects lie in the provision of a battery which it is impossible to install backwards or with reversed terminals, and one which it is very easy to charge, the terminals of the battery being positioned so as to be easily connectible to terminals of an adjacent battery for series charging.

Other objects of the invention lie in the novel battery structure per se and in combination with the container, this battery including terminal posts only at one end, the remaining terminal posts being completely covered. Another feature of the battery of the invention is the provision of filling passages through the terminal posts themselves. Still another feature is the completely protected terminal posts forming a part of the present invention.

The switching system of the invention can be readily supported by the container, and this feature forms another object of the invention. So also the invention includes among its objects the provision of a novel arrangement of uses and connecting buss systems which are mounted on the battery container itself.

Further objects of the invention lie in the novel form of container utilized and providing a battery chamber into which the battery can be horizontally moved, certain features of this container being novel regardless of the type of battery used. These objects also include the provision of a battery container including a shelf onto which the battery can be preliminarily rested before being slid into the battery chamber, and include a flange structure extending from the container for installing this container in an opening of an automobile dashboard or other vertically extending member.

Still other objects and advantages of the invention will be made evident hereinafter.

Referring to the drawings in which the features of the invention are disclosed,

Fig. 1 is a vertical view, partly in section, of the battery, container, and switch means.

Fig. 2 is a sectional view taken on the line 2—2 of Fig. 1.

Fig. 3 is a horizontal sectional view taken on the line 3—3 of Fig. 2.

Fig. 4 is a sectional view illustrating a portion of the clamping means of the invention and is taken as indicated by the line 4—4 of Fig. 1.

Fig. 5 is a sectional view of the tongue-and-groove means for guiding and holding the battery in place and is taken on the line 5—5 of Fig. 2.

Fig. 6 is a cross-sectional view of an alternative form of channel and conductor bar.

Fig. 7 is an alternative switch means.

Fig. 8 is a typical wiring diagram utilizing the battery and switch means of the invention.

Fig. 9 is a fragmentary view illustrating how the novel battery container can be adapted to use with conventional types of batteries.

Figure 10:
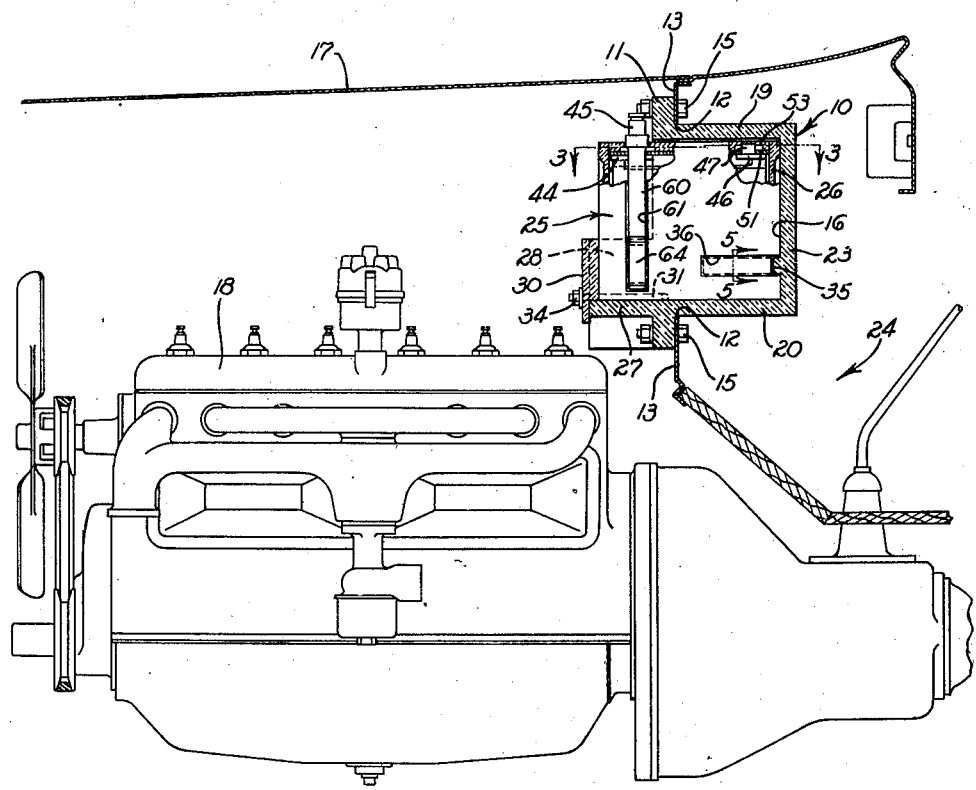
Fig. 10 is a sectional view indicating the relative position of the battery and container with respect to the engine and driving compartments of an automobile.

Referring particularly to Figs. 1, 2 and 10, I have illustrated a battery container 10 preferably formed entirely of molded hard rubber or other composition material and carrying a vertical flange 11 extending completely therearound at a section intermediate the front and rear ends of the container. As shown, the rear end of the container extends through an opening 12 of a mounting panel 13. In the form illustrated, this mounting panel takes the form of a dashboard of an automobile, the container being secured thereto by suitable means such as bolts 15 extending through the flange 11 and the dashboard. The container and its associated battery are thus supported at an intermediate section and are thus substantially balanced with respect to the mounting panel 13.

The container 10 provides a chamber 16 open at its forward end and thus communicating with the space underneath the hood of the automobile in this embodiment. Such a hood is indicated by the numeral 17, (see particularly Fig. 10), while the upper portion of the motor is indicated diagrammatically by the numeral 18. The chamber 16 is bounded by top and bottom walls 19 and 20, by side walls 21 and 22 (best shown in Fig. 1), and by a rear wall 23. This container thus effectively separates the chamber 16 from the interior or passenger compartment of the automobile.

Adapted to be slid horizontally into the chamber 16 through the open forward end thereof is a battery 25 including a battery case 26 preferably of molded unitary construction. To facilitate this horizontal movement of the battery I extend the lower wall 20 a distance forward from the upper wall 19 so as to form a shelf 27 on which the edge of the battery can be preliminarily rested, thus making it unnecessary for the operator in installing the battery to support the weight thereof as it is being moved horizontally into place. In the preferred embodiment I also extend the lower portions of the side walls 21 and 22 forward to form side members 28 and 29, these side members terminating adjacent the front edge of the shelf 27 and also extending downward to the bottom of the flange 11, thus forming supporting brackets for the shelf.

As best shown in Fig. 2, the battery case 26 is of less depth than the chamber 16 so that a portion of the forward part of the battery is exposed. The side members 28 and 29 preferably extend slightly forward of the battery, and to secure the battery in place I provide a member 30 which extends across the open front of the chamber 16 and engages the battery case 26. In the preferred embodiment I form a groove around three sides of this member 30 of such size that the front walls of the shelf 27 and the side members 28 and 29 extend therein.

Any suitable means can be used for securing the member 30 in place. It has been found preferable to use an L-shaped pin 31 with one leg insertable into an opening 32 of each side wall and preferably formed through the flange, as best shown in Fig. 4. The other leg of this L-shaped pin lies in a channel 33 cut in the corresponding side member and provides a threaded end which extends through an opening of the member 30. A wing nut or bolt 34 can be used to draw the member 30 into clamping relationship with the battery case, this relationship taking place preferably when the member 30 comes into abutting relation with the ends of the shelf 27 and side members 28 and 29. Such a means for securing the member 30 in clamping relationship is particularly advantageous due to its simplicity and ease of replacement. Incidentally, the L-shaped members are the only metallic parts of the battery enclosing structure.

As best shown in Fig. 1, the length of the battery case 26 is only very slightly less than the distance across the chamber 16 so that the side walls 21 and 22 prevent any material lengthwise movement of the battery. However, the height of the battery is somewhat less than the vertical dimension of the battery case and in the preferred embodiment I hold the battery case down in the container by inter-engaging shoulders on the battery case and on the container. A tongue-and-groove arrangement may conveniently provide such shoulders, and in the form illustrated there is shown a tongue 35 extending inward from the side walls 21 and 22 and the rear wall 23 of the container 10. As shown in Fig. 2, this tongue is placed near the bottom of the chamber 16 and does not extend throughout the whole depth of the container 10. A corresponding groove 36 is cut in the side walls and end wall of the battery case 26, the lower shoulder of the tongue and the lower wall of the groove 36 preventing the battery case 26 from rising in the chamber 16. In addition, the tongue 35 and groove 36 preferably extend horizontally and serve to guide the battery as it is being slid horizontally into the chamber 16.

The battery 25 is of novel construction. As illustrated, the battery case 26 provides one or more cells or compartments 38, three of these being illustrated. Webs 39 at the bottom of each compartment serve to support sets of battery elements 40 and 41 which, according to conventional practice, are formed of vertically extending plates separated by insulator plates not shown. Alternate plates are impregnated in any of the well-known manners so that when acid is placed in the compartments and the individual cells are charged by passing a current therethrough, the alternate plates become oppositely charged. The plates of one set of battery elements are connected together by the usual strap 44 which carries an upward-extending terminal post 45. Similarly, the plates of the other set of battery elements are connected together by a strap 46 from which a short terminal post 47 extends upward.

In the embodiment shown the short terminal post 47 terminates below the upper edge of the battery container 26 so as to be positioned in the compartment. The long terminal post 45, however, extends a material distance above the upper edge of the battery container 26 and provides a threaded passage 49 communicating with the compartment to supply acid thereto and to receive testing equipment. This feature of a filling passage formed through a terminal post is a very desirable one. It not only eliminates the necessity for separate filler openings in the top of each cell, but in effect increases the effective height of the filling passage, thus preventing any of the acid from being splashed from the upper end. In addition, this feature effects a distinct saving of space in the present invention, and permits substantially the whole of the upper end of the battery to be enclosed.

The preferred method of closing the upper ends of the cells is best illustrated in Figs. 1, 2, and 3. As therein shown, it is preferable to use a thin plate 51 of hard rubber or other insulating materials and resting on the straps 44 and 46 and providing holes corresponding in position to the terminal posts 45 and 47. The desired terminal posts of adjacent cells can then be connected together by lead straps such as indicated by the numerals 53 and 54. If desired notches 55 can be cut in the dividing walls separating the cells to permit passage of these straps. These straps are preferably connected as shown so that both the positive and negative terminals of the battery will be on the front side thereof. Two of the long terminal posts 45 can conveniently serve this purpose. The upper end of each cell is then filled above the plate 51 with suitable battery compound. Preferably this compound completely covers all of the short terminal posts 47 and the straps 53 and 54 so that the only portions projecting from the top of the battery are the terminal posts 45.

As best shown in Fig. 2, these terminal posts 45 extend upward from the exposed forward portion of the top of the battery and extend upward in front of the flange 11, thus making filling, inspection, and testing of the battery easy. In addition, it is often preferable to enclose each of the terminal posts 45 with a sleeve of insulating material indicated by the numeral 57 and resting against a shoulder 58 of the terminal post around which it is positioned. This, together with the filler cap 59, also formed of insulating material, completely protects the terminal post from contact with any tool, etc., which might carelessly be positioned on top of the battery by a workman. The protecting sleeve 57 also prevents any tendency of the terminal post 45 to corrode.

In the preferred embodiment of the invention I prefer to make all connections to the battery at a position spaced from the upper end thereof and thus out of the acid-fume zone. In accomplishing this end I provide a lead strap 60 secured to the terminal post 45 of each of the end cells and extending downward along the exterior of the battery case. Preferably, vertical channels 61 are cut in the exterior surface of the battery case to receive these lead straps. If desired, these slots may be cut of trapezoidal shape, as shown in Fig. 6, utilizing straps of such shape as to be retained therein. It is possible to utilize a protecting strip of insulating material 63 covering the strap if desired. Such a protection can be applied regardless of the shape of the channel, but the shape shown in Fig. 6 is particularly adaptable to the use of such a strip of insulating material in that it can be longitudinally moved into the trapezoidal-shaped slot as shown, being held in place without auxiliary connections.

In eliminating all corrosion it is necessary to eliminate dissimilar materials through which the current passes, especially if these dissimilar materials are in the acid zone at the top of the battery. In effecting this end I form the straps 60 of lead and provide thereon a ring-type connection which is lead-burned to the terminal post 45, thus making a lead-to-lead contact entirely free from corrosion. In addition, the junction between the ring-type connection and the terminal post 45 is positioned beneath the battery compound so as to be sealed from the atmosphere and also from any acid fumes that may rise in the passages 49 of the terminal posts.

The lower end of each strap 60 is preferably provided with a flat terminal plate 64 suitably secured or locked to the strap. Preferably this terminal plate is formed of copper or brass, and the back and edges thereof are preliminarily tinned before being sweated to the strap 60, thus forming an excellent connection not subject to corrosion. If desired all of the current drawn from the battery may be taken from these terminal plates.

As disclosed, the left-hand terminal plate shown in Fig. 1 may be grounded to the frame of the car through a spring contact means. This means may conveniently include a box-like structure 66 slidably retaining a contact member 67 to which a flexible conductor 68 is connected. A spring 69 may be compressed between the cover of the box-like structure 66 and a shoulder of the contact member to resiliently urge this contact member into firm engagement with the terminal plate. The spring 69 also tends to force the battery case 26 rightward in the chamber 16. Any very slight movement of the battery in this chamber will tend to cause a slight relative shifting of the terminal plate 64 and the contact member 67, thus forming a self-cleaning electrical contact. If desired the battery may be resiliently mounted in the chamber 16 as by being spaced from the walls thereof by rubber members of a slightly resilient nature. Usually, however, these are not necessary, the very slight "give" of the clamping member 30 and the container 10 allowing a sufficient relative shifting between the contact member 67 and the terminal plate 64 to give very excellent contact. In other instances no such relative movement between these members is essential.

Current may be taken from the other terminal plate 64 shown in the right half of Fig. 1 by any contact means engaging this terminal plate when the battery is in position. Such a contact means may take the form of a contact member 75 positioned in a bore of the side wall 29 and slidable therein. A spring 76 in this bore resiliently urges the contact member 75 into contact with the terminal plate 64, this spring being compressed between a shoulder of the contact member 75 and a cover member 77 removably closing the outer end of the bore and, if desired, acting to slidably journal the contact member 75.

Current may also be taken from this terminal plate 64 through a contact member 80 slidable in a bore of the side wall 29 and resiliently urged into contact with the terminal plate by any suitable spring means illustrated as comprising a flat spring 82 bearing against an arm 83 secured to the contact member 80. If desired this switch means may be remotely operated, the form illustrated including a cam 85 which moves into engagement with the arm 83 when it is desired to open the switch means, the cam rotating until a flat surface 86 thereof engages the arm 83, thus preventing the spring 82 from returning the contact member into engagement with the terminal plate 64. This cam 85 is shown as being connected to a rod 87 which passes through a corresponding angled opening formed through the flange 11 and the dashboard 13, this rod extending into the driver's compartment of the car. Here it can be manually turned by any suitable means such as a handle 88 shown, and, if desired, this means may include a lock 89 so that the contact member 80 cannot be moved into engagement with the terminal plate 64 when the system is locked. Such a system is particularly desirable when the contact member 80 is connected in the control circuit for the starter or to the ignition circuits, as will be hereinafter described.

It is preferable to use a separate switch means for taking the starter current from the terminal plate 64, and this switch means is preferably remotely operated. In the form shown in Fig. 1, I provide a tubular shell 90 closed at one end by a removable cover 91. A solenoid 92 is retained in this tubular shell 90 and, when energized, attracts an armature 93 formed of magnetic material. This armature is hollow and in reality forms a metallic sleeve extending around a central reduced-diameter portion of a contact member 95 which is slidable in the tubular shell 90 when the solenoid 92 is energized, thus moving into firm contact with the terminal plate 64. The current is taken from the contact member 95 through a flexible copper lead 96 coiled inside the tubular shell, a terminal stud 97 retaining the fixed end of this flexible lead and extending through the cover 91. Thence the current may be carried by a short conductor 98 to a stud 99 extending through a lug 100 of the container and thence through an insulated conductor 101 extending directly to the starter of the car. A spring 102 withdraws the contact member 95 from engagement with the terminal plate 64 when the solenoid is deenergized. It will thus be apparent that all of the connections to the starter are dead except during the actual starting operations, thus eliminating the fire hazard of a high-capacity conductor permanently connected to the live terminal of the battery as is conventional practice.

If desired the switch means and the lug 100 may be enclosed by a removable cover 105. A slot 106 may be formed therein directly beneath this shelf 99 so as to receive the insulated conductor 101 when the cover is in place.

One method of connecting these switch means to the circuits of the automobile is indicated in Fig. 8 for illustrative purposes. Thus, considering that the positive side of the battery is grounded, the negative side of the battery will be connected to the terminal plate 64 associated with the switch means. As shown, the contact member 75 may be connected by a conductor 110 to a fuse 111 and thence to a buss 112. To this buss may be connected the conventional horn circuit including a switch and a horn 113, one terminal of which is grounded. So also any desired lighting circuit may be connected to this buss through a suitable switch, a typical circuit being indicated by the numeral 116. Preferably the higher-current lighting circuits, such as the head-lamp circuits, are not so connected, though this system may be used if desired. Also connected to the buss 112 is the generator 117, a conventional cut-out 118 being connected in series therewith. Thus, the generator is at all times connected to the battery through the cut-out 118 which functions in the usual manner. Other circuits may be connected to the buss 112 through suitable switch means if desired.

On the other hand, the contact member 80 is connected by a conductor 120 to a fuse 121 and thence to a buss 125. This buss is of course energized only when the cam-operated contact member is in engagement with the terminal plate 64. The lighting circuits of high current requirements may be connected thereto, as indicated by the numeral 126. In this way it is impossible to leave these high-current circuits energized when the car is locked, for locking the car moves the contact member 80 from the terminal plate 64, thus deenergizing the buss 125.

It is preferable to connect the ignition circuit to the buss 125. As indicated the primary winding of a spark coil 130 is shown connected to this buss in series with the usual make-and-break switch 131. The secondary winding of the spark coil is connected to the distributor 133, as diagrammatically shown.

I also prefer to energize the solenoid 92 from the buss 125, thus making it impossible to energize the starter when the car is locked. As shown, the solenoid 92 is connected to this buss through a push-button switch 135 positioned at a convenient location in the driving compartment. Depressing this push-button thus energizes the solenoid and thus connects the starter, indicated in Fig. 8 by the numeral 140, to the battery.

I find it very convenient to mount the fuses 111 and 121 as well as the buss 112 and the buss 125 directly on the outer face of the side wall 29 of the container and beneath the cover 105. This permits both the switch means and the fuses to be mounted in adjacent relation and in a position close to the buss system and represents a distinct saving both in wiring and space and also permits the mounting of the fuses in a readily accessible position should replacement be necessary.

In Fig. 7 I have illustrated an alternative form of switch means which is particularly well adapted to use in conjunction with the starting circuit, though a switch of this type may be substituted for the switch means including the contact members 75 and 80 if desired. In this form of switch a copper plunger 150 is slidably carried by a hub of a plate 151 retained in an opening 152 of the container. A spring contact 153 is carried by the inner end of this plunger 150 and contacts the terminal plate 64 with a well-known wiping contact. The outer end of this plunger loosely extends through an opening in the upper end of an arm 157 pivoted at 158, this arm forming an armature attracted by a magnet 159 connected as was the solenoid winding 92 previously mentioned. The plunger 150 carries a pin 160 against which a washer 161 is held by a spring 162 compressed between the washer 161 and a washer 164 slidable along the plunger and engaging the arm 157. A cover 166 preferably encloses the switch structure and current is conducted from the switch through a stud 167 insulated with respect to the cover 166 and connected to the outer end of the plunger 150 by a flexible conductor 169. When the magnet 159 is energized the armature 157 moves leftward to first bring the spring contact 153 into pressural engagement with the terminal plate 64 after which further leftward movement of the arm 157 results in compressing the spring 162. The core of the magnet 159 forms a stop for the armature 157. Once the armature 157 contacts the core of this magnet, only a very small amount of current is required to maintain the switch closed, thus making the switch readily adaptable not only to the starting circuit, but also to the circuits energizing the buss 125 and also the buss 112 if desired.

It should not be understood that the container 10 herein shown is limited in utility to use in conjunction with the novel battery structure shown. Many of the objects of the invention can be obtained even if a battery of conventional construction is utilized. Thus, in Fig. 9 I have shown one corner of the container 10 when associated with a battery of conventional design and having exposed terminal posts 180. In this instance it is preferable to sweat a ring 181 to each terminal post, a flexible conductor 183 being secured to the ring 181 and extending to a terminal plate 185. This plate may be of the same design as the terminal plates previously described and current may be taken therefrom, as previously set forth, or, if desired, it may be permanently connected to the starting and lighting circuits. A terminal stud 186 may conveniently connect the flexible conductor 183 to the terminal plate 185, and can also serve to clamp the terminal plate 185 to the container 10. A similar construction can be used for grounding the other terminal post of the battery.

In this form of the invention the flexible conductors are of sufficient length to permit the battery to be moved forward on the shelf 27 a sufficient distance so that access can be had to the conventional centrally located filler caps 188. Thereafter the battery can be moved further into the container 10 and clamped in place by the member 30. The clamping action exerted by this member is sufficient to hold the battery both horizontally and vertically immovable. Such a construction permits the novel placement of the battery with respect to the automobile and permits the use of a container which includes substantially no metal parts.

It will be readily apparent that the preferred embodiment of the battery structure herein described eliminates substantially all corrosion in that no dissimilar metals are positioned in the acid-fume zone and all electrical contacts in this zone are permanent in their nature and are not of the clamp-type now in general use. Further, current leakage is materially decreased both because of the absence of corrosion and because of the drying action of the engine of the car, thus preventing the condensation of moisture on the battery case and removing any moisture that should reach this case through any reason. The positioning of the battery disclosed removes it from a position where it has ready access to moisture, mud, etc., thrown by the tires of the automobile, an important feature of the invention.

Another feature of the invention is the convenience of inspection or replacement, such replacement requiring no unclamping of terminals, etc. Further, it is impossible to install the battery in a reversed position. The complete elimination of exposed metallic parts at the upper end of the battery is also an important detail, as well as the almost complete elimination of metallic parts associated with the container.

A very important advantage of the terminal plate structure is that it permits a push-button control for the starter and eliminates the conventional starter cable permanently connected to the battery and which is the source of most fires. Such a terminal plate structure also permits a better location for fuses and distribution buss, and effects a distinct saving in cost of preliminary charging of the battery. In the latter connection it is to be noted that much time is at present consumed in attaching charging leads through suitable clamping means. With the herein disclosed system the batteries can be placed end to end with adjacent terminal plates in contact with each other for series charging. If the terminal plates terminate short of the outer surface of the battery case, it is only necessary to place a small spacer between terminal plates of adjacent batteries when thus charging. If desired, the entire group of batteries thus being charged may be resiliently urged toward each other to form an excellent contact between adjacent batteries.

Further, the battery herein shown permits the use of a locked battery switch which deenergizes any desired circuit when the car is locked, thus preventing drainage of the battery through forgetfulness in turning off these circuits. It also permits the use of a simple theft-proof system for locking the ignition circuit of the car.

A further advantage of the present battery system is that it is much safer in case of an accident causing overturning of the car. With a battery in the conventional location beneath the floor-boards of the driving compartment such over-turning of the car spills acid into the driving compartment, thus destroying upholstering. Such accidents have caused permanent disfiguration of operators who happen to be pinned beneath the car. In the present system no acid will spill from the battery unless the car is turned completely over, and even then the acid will not reach the driving compartment because of the presence of the walls of the battery container 10 which separates the battery chamber therefrom.

I claim as my invention:

1. In combination: a battery container providing a horizontally disposed chamber; a battery slidable horizontally into said chamber; horizontally-disposed tongue-and-groove means cooperating with said battery and with said container for holding said battery against vertical movement in said container and guiding said battery during horizontal insertion into said chamber; and removable means extending across the front of said chamber for holding said battery in place.

2. In combination: a battery container providing a horizontally disposed chamber; a battery slidable horizontally into said chamber; a horizontal shoulder on said container and positioned in said chamber; a corresponding horizontal shoulder on said battery and slidably engaging said shoulder of said container for guiding said battery as it moves into said chamber and holding said battery in fixed vertical position when in said chamber; and removable means for holding said battery in place.

3. In combination: a container means providing a horizontally disposed chamber open at one end and adapted to receive a battery case means; a battery case means horizontally slidable into said chamber from its open end; battery elements in said case means; a horizontal tongue on one of said means; and walls forming a horizontal groove on the other of said means and slidably receiving said tongue, said tongue-and-groove guiding said battery case means as it moves into said chamber and retaining same against vertical movement.

4. In combination: a container providing a chamber open at one end; a battery case slidable into said chamber from its open end; battery elements in said case; and tongue-and-groove means associated with said battery case and engageable with said container for permitting entry of said battery case when in but a single position.

5. In combination with a mounting panel having an opening therein, said panel comprising the dashboard of an automobile, there being a hood extending forward from said dashboard: a battery container fitting into said opening and providing a horizontally extending chamber open at its front end, said front end of said chamber opening under said hood to receive a battery; a flange on said battery container and engaging said mounting panel; and means for holding said battery in place in said chamber.

6. In combination with a vehicle including engine and passenger compartments separated by a panel provided with an opening, there being an engine and a fan driven thereby in said engine compartment: a battery; a battery container closing said opening and providing a chamber closed on a plurality of sides and adapted to receive said battery, said battery container providing a space opening on said engine compartment for exposing a portion of said battery to the draft of said fan when said battery is in position; and filler means on said battery and positioned opposite said space of said container.

7. In combination: a battery container providing a rear wall, a bottom wall and side walls co-operating in defining a horizontally disposed chamber; a battery slidable horizontally into said chamber, leaving exposed the forward portion of the top of said battery when said battery is completely inserted; and terminal means extending upward from said exposed top portion of said battery to a position above the upper portion of said chamber.

8. In combination: a battery container providing a horizontally disposed chamber; a battery slidable horizontally into said chamber, said battery container providing a top wall extending only partially across said battery to leave exposed the forward portion of the top of said battery when said battery is completely inserted in said battery container, said battery including a case defining a compartment and providing oppositely charged sets of battery elements in said compartment, said compartment containing a liquid; and terminal means extending upward from said exposed top portion of said battery and electrically connected to one of said sets of battery elements, said terminal means being hollow to define a filling passage communicating with said compartment.

9. In combination with an upright mounting panel having an opening therein: a battery container fitting into said opening and providing a battery chamber bounded at its lower end by a horizontal wall and at its rear end by a rear wall;

a battery providing filler means at its upper end and insertable into said battery chamber and of such horizontal dimension as to occupy a space commensurate with the space between said rear wall and the forward portion of said horizontal wall, said battery container being open at its upper end sufficient to expose said filler means and at least the forward portion of the top of said battery; a flange on said battery container and positioned to engage said upright mounting panel, said flange being positioned intermediate the forward and rearward portions of said battery container whereby a portion of said container extends forward from said upright mounting panel and a portion of said container extends rearward from said upright mounting panel; and means for securing said battery container in said opening of said mounting panel.

10. In combination with a vehicle including engine and passenger compartments separated by a panel provided with an opening, there being an engine in said engine compartment: a battery container of a size to fit into said opening and providing impervious walls including a rear wall, side walls and a bottom wall, said walls bounding a battery-receiving chamber opening on said engine compartment and completely separating said passenger compartment from said battery-receiving chamber, said walls providing an open space through which said battery-receiving chamber communicates with said engine compartment.

11. As an article of manufacture: a one-piece molded container of non-corrosive material for battery elements and providing a plurality of walls bounding a chamber open at its front end to receive a battery providing a filler means and open at its upper end sufficient to leave exposed said filler means when the battery is in place, said plurality of walls including a rear wall and bottom and side walls extending forward from said rear wall, said molded container being provided with a supporting flange extending outward from each of said side walls and molded integral therewith, all of said walls being integrally molded whereby said supporting flange and said walls are molecularly homogeneous.

12. As an article of manufacture: a unitary container of non-corrosive material for a storage battery comprising a top wall, a bottom wall extending forward a distance farther than said top wall, a rear wall, and two side walls, said walls being molecularly homogeneous and cooperating in defining a chamber bounded on five sides with the sixth side open to permit movement of a storage battery thereinto in a horizontal direction, said top, bottom, and side walls being forward-extending walls, and flange means extending outward from at least a part of said forward-extending walls at a position forward of said rear wall, said flange means being molecularly homogeneous with the walls from which it extends.

13. In combination with a battery providing six surfaces: a battery container means adapted to receive said battery and providing six walls bounding a battery-receiving chamber including two side walls, two end walls, a top wall and a bottom wall, said walls respectively extending across the six surfaces of said battery when in said chamber, said top wall extending only partially across the top of said battery to leave exposed one portion of said top of said battery; filler means on said battery and extending upward from said exposed portion of the top of said battery to a position above the top of said chamber; and means removably mounting one of said walls relative to the remaining walls to permit insertion of said battery into said chamber.

14. In combination: a battery container providing six walls including a top wall and cooperating to bound a battery-receiving chamber, five of said walls being integrally formed and the remaining sixth wall being removable to permit insertion of a battery; a battery movable into said battery-receiving chamber when said sixth wall is removed, said battery providing a case defining an electrolyte-containing compartment and sets of battery elements therein, said battery providing terminal means electrically connected to one of said sets of battery elements and extending upward to a position above the uppermost portion of said battery-receiving chamber, said terminal means being hollow to define means through which electrolyte can be added to said compartment, said top wall of said battery container extending only partially across the top of said battery to provide a space into which said terminal means extends upward; and means for securing said removable sixth wall in position.

15. A combination as defined in claim 14 including enclosing means formed of insulating material and surrounding at least a portion of said hollow and upward-extending terminal means.

16. In combination in an apparatus for receiving and retaining a battery: a container providing an upright rear wall, two side walls extending forward therefrom and a bottom wall extending forward from said rear wall and between said side walls to define a chamber open at its forward end and into which a battery may be horizontally moved, said bottom wall extending forward to form a shelf providing a support for said battery when the rear portion thereof is rested thereon preparatory to subsequent horizontal movement of said battery into said chamber toward inserted position, the distance between the forward edge of said shelf and the chamber-bounding surface of said rear wall being such that when said battery is in inserted position a portion of said battery will still be above said shelf; a mounting flange means extending outward from said container at a section between said rear wall and the forward edge of said shelf whereby a portion of said battery extends forward of said flange when in said inserted position so that said battery is supported at a section between its forward and rear surfaces; and means for retaining said battery in said inserted position, said means including a member extending across the forward open end of said chamber when said battery is in inserted position and detachable means extending between said member and said flange means for holding said member against said battery.

17. A combination as defined in claim 1 including a mounting flange extending outward from said battery container at a section between the front and rear thereof, said flange being provided with an opening which extends away from said chamber, an L-shaped member providing two legs one of which extends in said opening, and means for attaching the other of said legs to said removable means extending across the front of said chamber.

18. In combination with an upright panel separating the engine compartment of an automobile from the interior thereof: a battery container providing a rear wall, two side walls and a bottom wall, said walls thus bounding a chamber open at its front end and into which a battery may be horizontally moved, said bottom wall extending forward to provide a shelf on which said battery may be rested preparatory to horizontal movement into said container, the distance between the chamber-bounding surface of said rear wall and the front edge of said shelf being such that the front portion of said battery lies above said shelf when said battery is in inserted position; flange means extending outward from said container and engaging said panel to support said container and said battery, said flange means being positioned at a section between said rear wall and the front edge of said shelf whereby said container extends partially into said engine compartment and partly into the interior of said automobile and whereby the weight of said battery and container is carried between said rear wall and said front edge of said shelf; and means for retaining said battery in said container.

19. As an article of manufacture: a unitary container for horizontally receiving a battery and including a rear upright wall, two side upright walls and a bottom wall molded into a unitary structure and cooperating to define a battery-receiving chamber open at its forward portion whereby a battery can be moved thereinto in a horizontal direction while its weight is carried by said bottom wall, the forward portion of said bottom wall providing a shelf adapted to contact said battery preparatory to subsequent horizontal movement of said battery into completely inserted position, the distance between the forward edge of said shelf and the front chamber-bounding surface of said rear wall being such that a portion of said battery will be above said shelf even when said battery is completely inserted and contacts said rear wall, said container including a mounting flange molded integrally therewith and extending away from said chamber and being positioned between said rear wall and said forward edge of said shelf whereby a portion of said battery when in inserted position extends forward of said flange so that said battery is supported at a section between its forward and rear surfaces.

20. In combination in an apparatus for receiving and retaining a battery: a unitary container for horizontally receiving said battery and including an upright rear wall, two side walls and a bottom wall extending forward to form a shelf, said walls being molded together to define a unitary structure and bounding a chamber open at its forward end and into which said battery can be horizontally moved, said shelf providing a support for said battery when the rear portion thereof rests thereon preparatory to subsequent horizontal movement of said battery into said chamber toward inserted position, the distance between the forward edge of said shelf and the chamber-bounding surface of said rear wall being such that when said battery is in inserted position a portion of said battery will still be above said shelf, said unitary container including a mounting flange means molded integrally therewith and extending outward from said side walls at a section between said rear wall and the forward edge of said shelf whereby a portion of said battery extends forward of said flange when in said inserted position so that said battery is supported at a section between its forward and rear surfaces; and means for retaining said battery in said inserted position.

21. In combination in an apparatus for receiving and retaining a battery: a unitary container for horizontally receiving said battery and including an upright rear wall, two side walls and a bottom wall extending forward to form a shelf, said walls being molded together to define a unitary structure and bounding a chamber open at its forward end and into which said battery can be horizontally moved, said shelf providing a support for said battery when the rear portion thereof rests thereon preparatory to subsequent horizontal movement of said battery into said chamber toward inserted position, the distance between the forward edge of said shelf and the chamber-bounding surface of said rear wall being such that when said battery is in inserted position a portion of said battery will still be above said shelf; means for supporting the weight of said battery and container at a section between said rear wall and said forward edge of said shelf; and means for retaining said battery in said inserted position.

22. In combination in an apparatus for receiving and retaining a battery: a container providing an upright rear wall, two side walls extending forward therefrom and a bottom wall extending horizontally forward from said rear wall and between said side walls to define a chamber open at its forward end and into which a battery may be horizontally moved, said bottom wall extending forward to form a shelf providing a support for said battery when the rear portion thereof is rested thereon preparatory to subsequent horizontal movement of said battery into said chamber toward inserted position, the distance between the forward edge of said shelf and the chamber-bounding surface of said rear wall being such that when said battery is in inserted position a portion of said battery will still be above said shelf; a mounting flange means extending outward from said container between said rear wall and the forward edge of said shelf whereby a portion of said battery extends forward of said flange when in said inserted position so that said battery is supported between its forward and rear surfaces; and means for retaining said battery in said inserted position.

23. In combination in an apparatus for receiving and retaining a battery: a container providing an upright rear wall, two side walls extending forward therefrom and a bottom wall extending horizontally forward from said rear wall and between said side walls to define a chamber open at its forward end and into which a battery may be horizontally moved, said bottom wall extending forward to form a shelf providing a support for said battery when the rear portion thereof is rested thereon preparatory to subsequent horizontal movement of said battery into said chamber toward inserted position, the distance between the forward edge of said shelf and the chamber-bounding surface of said rear wall being such that when said battery is in inserted position a portion of said battery will still be above said shelf; means extending outward from said side walls for supporting the weight of said battery and container predominantly at a section between said rear wall and said forward edge of said shelf; and means for retaining said battery in said inserted position.

24. As an article of manufacture: a unitary molded container of non-corrosive material providing a chamber for a storage battery comprising an impervious rear wall and a plurality of forward-extending walls extending forward therefrom, said forward-extending walls including a bottom wall and two side walls, the lower portion of said side walls extending forward to terminate adjacent the front edge of said bottom wall, the upper portions of said side walls terminating short of the lower portions thereof whereby a portion of said chamber is open to expose a portion of the sides of a battery when positioned therein; and flange means extending outward from a plurality of said forward-extending walls at a position in front of said rear wall and being molded thereto to be molecularly homogeneous therewith.

25. In combination with an automobile having a panel separating the passenger compartment from the engine compartment: walls defining a battery container open at its forward end and adapted to receive a battery; and means for connecting said battery container to said panel in such position that a portion of said container extends rearward into said passenger compartment, the open forward end of said chamber opening on said engine compartment.

26. In combination with an automobile providing engine and passenger compartments separated by a panel, said panel providing an opening therein: a battery container providing a forward end opening on said engine compartment and substantially filling said opening, the rear of said battery container extending a distance into said passenger compartment; and means for securing said battery container to said panel whereby the weight of said container and any battery which may be disposed therein is carried by said panel.

27. In combination in an apparatus for mounting a battery in an automobile providing passenger and engine compartments separated by a panel, said panel providing an opening: a battery container providing a chamber open at its front end and providing a bottom wall and a rear wall, the distance between said rear wall and the forward end of said bottom wall being about the same as the distance between the front and rear walls of said battery whereby said battery can be moved horizontally into an inserted position in which position the forward part of said battery is exposed; and means for mounting said battery container in said opening so that the forward part of said battery is exposed to said engine compartment.

JOHN L. SAGER.

CERTIFICATE OF CORRECTION.

Patent No. 2,206,306. July 2, 1940.

JOHN L. SAGER.

It is hereby certified that error appears in the printed specification of the above numbered patent requiring correction as follows: Page 2, first column, line 58, for the word "uses" read --fuses--; page 6, second column, line 17, claim 4, strike out "engageable with--; and that the said Letters Patent should be read with this correction therein that the same may conform to the record of the case in the Patent Office.

Signed and sealed this 10th day of September, A. D. 1940.

(Seal)
Leslie Frazer,
Acting Commissioner of Patents.